(12) United States Patent
Saito et al.

(10) Patent No.: US 8,436,505 B2
(45) Date of Patent: May 7, 2013

(54) ELECTRIC MOTOR AND REDUCTION MOTOR

(75) Inventors: Tatsuyuki Saito, Kiryu (JP); Ryuichi Takakusagi, Kiryu (JP); Toshiyuki Kimura, Kiryu (JP); Yoshichika Kawashima, Kiryu (JP); Kenji Sakata, Kiryu (JP)

(73) Assignee: Mitsuba Corporation, Gunma (JP)

( * ) Notice: Subject to any disclaimer, the term of this patent is extended or adjusted under 35 U.S.C. 154(b) by 6 days.

(21) Appl. No.: 12/998,316

(22) PCT Filed: Oct. 7, 2009

(86) PCT No.: PCT/JP2009/005229
§ 371 (c)(1),
(2), (4) Date: May 5, 2011

(87) PCT Pub. No.: WO2010/041448
PCT Pub. Date: Apr. 15, 2010

(65) Prior Publication Data
US 2011/0198954 A1    Aug. 18, 2011

(30) Foreign Application Priority Data

Oct. 7, 2008    (JP) ................................. 2008-260987

(51) Int. Cl.
*H02K 13/00*    (2006.01)
(52) U.S. Cl.
USPC ........................... 310/238; 310/233; 310/245
(58) Field of Classification Search .......... 310/230–234, 310/236, 238–241, 245, 248
See application file for complete search history.

(56) References Cited

U.S. PATENT DOCUMENTS

| | | |
|---|---|---|
| 4,754,184 A | 6/1988 | Morikane et al. |
| 5,047,679 A | 9/1991 | Baader et al. |

(Continued)

FOREIGN PATENT DOCUMENTS

| | | |
|---|---|---|
| CN | 1417928 | 5/2003 |
| CN | 1512647 | 7/2004 |

(Continued)

OTHER PUBLICATIONS

Translation for JP-2007-143278A (Jun. 7, 2007).*

(Continued)

*Primary Examiner* — Nguyen N Hanh
(74) *Attorney, Agent, or Firm* — Kenyon & Kenyon LLP (57) ABSTRACT

Disclosed is a motor in which a commutator (10) is provided with connecting wires which short-circuit equipotential segments; brushes (21) are constituted by a low-speed brush (21a), a high-speed brush (21b), and a common brush (21c) used in common by the low-speed and high-speed brushes, and are juxtaposed along the circumferential direction. The circumferential brush width (W2) of the high-speed brush is set to be smaller than the circumferential brush width (W1) of the low-speed brush. The high-speed brush and the low-speed brush are formed so that simultaneous sliding contact with equipotential segments (15) can be avoided. Additionally, armature cores (8) are provided such that a plurality of teeth (12) is point-symmetrical about a rotary shaft (3) at equal intervals in the circumferential direction, and the teeth and slots (13) are formed so as to exist alternately at intervals of 90 degrees in the circumferential direction. By virtue of the above configuration, vibration and noise can be reduced while achieving miniaturization and high performance of a motor.

6 Claims, 5 Drawing Sheets

U.S. PATENT DOCUMENTS

| | | | |
|---|---|---|---|
| 5,306,974 A * | 4/1994 | Bates | 310/68 R |
| 5,949,173 A * | 9/1999 | Wille et al. | 310/220 |
| 6,452,297 B2 | 9/2002 | Yamamoto et al. | |
| 6,617,744 B2 | 9/2003 | Kershaw et al. | |
| 6,694,599 B1 | 2/2004 | Kershaw et al. | |
| 7,291,957 B2 | 11/2007 | Simofi-Ilyes et al. | |
| 2004/0145268 A1 | 7/2004 | Yamamoto et al. | |
| 2005/0225198 A1* | 10/2005 | Simofi-Ilyers et al. | 310/264 |
| 2008/0231137 A1 | 9/2008 | Sugishima et al. | |
| 2010/0052440 A1 | 3/2010 | Shioda et al. | |
| 2011/0018380 A1 | 1/2011 | Yoshida et al. | |

FOREIGN PATENT DOCUMENTS

| | | |
|---|---|---|
| JP | Y-S45-004747 | 3/1970 |
| JP | A-S61-112556 | 5/1986 |
| JP | A-H02-184246 | 7/1990 |
| JP | A-H03-011963 | 1/1991 |
| JP | A-H02-500960 | 2/1991 |
| JP | U-H05-018272 | 3/1993 |
| JP | U-H07-028756 | 5/1995 |
| JP | A-H09-023627 | 1/1997 |
| JP | A-H10-503640 | 3/1998 |
| JP | 2000-060049 | 2/2000 |
| JP | 2000-166185 | 6/2000 |
| JP | 2001-069723 | 3/2001 |
| JP | 2001-095219 | 4/2001 |
| JP | 2001-112217 | 4/2001 |
| JP | 2001-231219 | 8/2001 |
| JP | 2001-268856 | 9/2001 |
| JP | 2001-320862 | 11/2001 |
| JP | 2002-017061 | 1/2002 |
| JP | 2002-058227 | 2/2002 |
| JP | 2002-218692 * | 8/2002 |
| JP | 2002-233123 | 8/2002 |
| JP | 2002-291210 | 10/2002 |
| JP | 2002-305861 | 10/2002 |
| JP | 2002-315274 | 10/2002 |
| JP | 2002-320361 | 10/2002 |
| JP | 2002-325390 | 11/2002 |
| JP | 2003-047223 | 2/2003 |
| JP | 2003-134772 | 5/2003 |
| JP | 2003-153488 | 5/2003 |
| JP | 2004-056851 | 2/2004 |
| JP | 2004-248460 | 9/2004 |
| JP | 2004-274816 | 9/2004 |
| JP | 2004-274821 | 9/2004 |
| JP | 2004-289992 | 10/2004 |
| JP | 2005-012945 | 1/2005 |
| JP | 2006-033947 | 2/2006 |
| JP | 2006-352993 | 12/2006 |
| JP | 2006-353019 | 12/2006 |
| JP | 2007-143278 | 6/2007 |
| JP | 2007-202391 | 8/2007 |
| JP | 2008-079451 | 4/2008 |
| JP | 2008-092731 | 4/2008 |
| JP | 2008-131800 | 6/2008 |
| JP | 2008-253086 | 10/2008 |
| JP | 2008-253137 | 10/2008 |
| JP | 2009-017719 | 1/2009 |
| JP | 2010-011697 | 1/2010 |
| JP | 2010-017078 | 1/2010 |
| JP | 2010-022198 | 1/2010 |
| JP | 2010-022199 | 1/2010 |
| JP | 2010-022200 | 1/2010 |
| JP | 2010-022201 | 1/2010 |
| JP | 2010-035403 | 2/2010 |
| JP | 2010-035405 | 2/2010 |
| JP | 2012-187000 | 9/2012 |
| JP | 2012-200145 | 10/2012 |
| JP | 2012-200146 | 10/2012 |
| WO | WO 2005/076442 | 8/2005 |
| WO | WO 2009/119456 | 10/2009 |
| WO | WO 2010/001899 | 1/2010 |
| WO | WO 2010/041448 | 4/2010 |

OTHER PUBLICATIONS

International Search Report issued on the underlying PCT/JP2009/005229 with English translation thereof.

Chinese Office Action mailing date of Oct. 19, 2012 on the underlying Application No. 200980139974.5 with English translation thereof.

* cited by examiner

FIG. 4 ized state, and a winding starting end and a winding finishing end of a coil are connected to each segment. Additionally, the segments are connected to brushes, respectively, so as to be capable of sliding contact with the segments, and electric power is supplied to the respective coils via the brushes. Also, a magnetic field is formed in a coil to which electric power is supplied, and a rotary shaft is driven by a magnetic attractive or repulsive force which is generated between the permanent magnets of the yoke.

ELECTRIC MOTOR AND REDUCTION MOTOR

TECHNICAL FIELD

The present invention relates to an electric motor mounted on, for example, a vehicle, and a reduction motor using the same.

Priority is claimed on Japanese Patent Application No. 2008-260987 filed on Oct. 7, 2008, the contents of which are incorporated herein by reference.

BACKGROUND ART

Electric motors with brushes have conventionally often been used as wiper motors for an automobile. In this kind of electric motor, a plurality of permanent magnets is arranged at equal intervals in the circumferential direction at the inner peripheral surface of a cylindrical yoke, and an armature is rotationally supported inside these permanent magnets. The armature has an armature core in which a plurality of teeth is formed in a radial fashion. A plurality of long slots is formed in the axial direction between the respective teeth, and coils are formed by coiling winding wires between the slots with predetermined intervals by an overlapping winding method. The coils are electrically connected to a commutator which is fitted and fitted to the rotary shaft from the outside so as to be adjacent to the armature core.

The commutator has a plurality of segments, which is metal pieces, arranged in the circumferential direction in a mutually insulated state, and a winding starting end and a winding finishing end of a coil are connected to each segment. Additionally, the segments are connected to brushes, respectively, so as to be capable of sliding contact with the segments, and electric power is supplied to the respective coils via the brushes. Also, a magnetic field is formed in a coil to which electric power is supplied, and a rotary shaft is driven by a magnetic attractive or repulsive force which is generated between the permanent magnets of the yoke.

Here, recently, from necessities of small size and high performance of the wiper motor, there is disclosed a technique for achieving multiple poles in which the number of magnetic poles is 4 (the number of pole pairs is 2) and multiple slots, achieving high performance in a motor, arranging four brushes at equal intervals in the circumferential direction, and making the speed of the motor variable (for example, refer to Patent Document 1).

In the motor of Patent Document 1, the amount of an electric current to be supplied to a coil in each mode of a LOW mode, a MID mode, and a HI mode is changed by changing energization patterns to the four brushes. Through this configuration, the rotational frequency of the motor in each mode can be changed while providing a motor in which the number of magnetic poles is 4, and multiple slots are achieved.

Prior Technology Documents

[Patent Document]
[Patent Document 1] Japanese Unexamined Patent Application, First Publication No. 2006-353019

DISCLOSURE OF THE INVENTION

[Problem to be Solved by the Invention]

Meanwhile, in the above-described motor, gaps are respectively formed between four permanent magnets disposed at the yoke. Thus, changes in magnetic flux increase between the permanent magnet side and the gaps with both circumferential ends of each permanent magnet as a border. For this reason, when each tooth passes through both the circumferential ends of each permanent magnet, a magnetic attractive or repulsive force which acts on the tooth changes greatly, and thereby cogging torque is generated. As a result, the vibration and noise of the electric motor increases.

The invention has been made in view of the above-described circumstances, and the object thereof is to provide a variable-speed electric motor and a reduction motor which can reduce vibration and noise while achieving miniaturization and high performance.

[Means for Solving the Problem]

The invention relates to an electric motor including a yoke whose number of pole pairs is 2, and an armature rotationally journalled to the yoke. The armature includes a rotary shaft journalled to the yoke; an armature core attached to the rotary shaft and having a plurality of teeth extending in a radial fashion toward the radial direction and allowing coils to be wound therearound, and a plurality of slots formed between the teeth and extending along the axial direction; and a commutator provided at the rotary shaft so as to be adjacent to the armature core, and having a plurality of segments arranged in the circumferential direction. Brushes which supply electric power to the coils via the segments come into sliding contact with the segments. In a first invention related to the invention, the commutator is provided with short-circuit members which short-circuit equipotential segments. Additionally, the brushes are constituted by three brushes of a low-speed brush, a high-speed brush, and a common brush used in common by the low-speed and high-speed brushes and juxtaposed along the circumferential direction. The circumferential width of the high-speed brush is set to be smaller than the circumferential width of the low-speed brush, and the high-speed brush and the low-speed brush are formed so that simultaneous sliding contact with the equipotential segments can be avoided. Additionally, the armature cores are provided such that the plurality of teeth is point-symmetrical about the rotary shaft at equal intervals in the circumferential direction, and the teeth and slots are formed so as to exist alternately at intervals of 90 degrees in the circumferential direction.

In a second invention related to the invention, the number of the plurality of teeth and the plurality of slots are set to any of 7 times, 9 times, and 11 times the number of pole pairs.

In a third invention related to the invention, the external diameter of the commutator is set within a range of 20 mm or more and 30 mm or less.

In a fourth invention related to the invention, the circumferential widths of the low-speed brush and the common brush are set within a range of 2.5 mm or more and 5 mm or less.

In a fifth invention related to the invention, the circumferential width of the high-speed brush is set to a range which is equal to or more than 1.5 mm or more and smaller than 2.5 mm.

Additionally, a sixth invention related to the invention provides a reduction motor including the electric motor according to any of the above first to fifth inventions, a worm shaft coupled to the rotary shaft of the electric motor, and a worm gear which meshes with the worm shaft.

[Effects of the Invention]

In the invention, the armature cores are provided such that the plurality of teeth is point-symmetrical about the rotary shaft at equal intervals in the circumferential direction, and the teeth and slots are formed so as to exist alternately at intervals of 90 degrees in the circumferential direction. Accordingly, in a case where the number of pole pairs is 2, the relative positional relationship between an N-pole and a tooth and a slot which face this N-pole and the relative positional relationship between an S-pole and a tooth and a slot which face this S-pole can be changed.

For this reason, the generation timing of the cogging torque generated in a tooth (slot) which passes through an N pole, and the generation timing of the cogging torque generated in a tooth (slot) which passes through an S pole can be shifted. Hence, the cogging torque of the whole armature decreases, and it is possible to reduce the vibration and noise of the electric motor.

Additionally, by setting the number of the plurality of teeth and the plurality of slots to any of 7 times, 9 times, and 11 times the number of pole pairs, multiple slots can be formed while reducing the vibration and noise. For this reason, a high-performance electric motor and a reduction motor can be provided.

Moreover, since the brushes are constituted by three brushes of a low-speed brush, a high-speed brush, and a common brush used in common by the low-speed and high-speed brushes, in respect to making the speed variable, the number of parts can be reduced as compared to the related art.

Moreover, the circumferential width of the high-speed brush is set to be smaller than the circumferential width of the low-speed brush, and the high-speed brush and the low-speed brush are formed so as to avoid simultaneous sliding contact with the equipotential segments. For this reason, the circumferential width of the segments is decreased compared to the related art, and miniaturization of the commutator is easily achieved. As a result, miniaturization of the whole electric motor can be achieved.

Here, in a case where the electric motor is rotationally driven at low speed, as the high-speed brush which is not used comes into sliding contact with a segment, a difference may be caused in the number of coils of an equivalent electric circuit and variation may occur in electric currents which flow through the respective coils. Thereby, vibration and noise of the electric motor may increase.

However, the influence of the high-speed brush during low rotational driving can be made small by setting the circumferential width of the high-speed brush to be smaller than the circumferential width of the low-speed brush. For this reason, an electric motor and a reduction motor with less vibration and noise can be provided.

BEST MODE FOR CARRYING OUT THE INVENTION

Next, an embodiment of the invention will be described with reference to the drawings.

Figure 1:
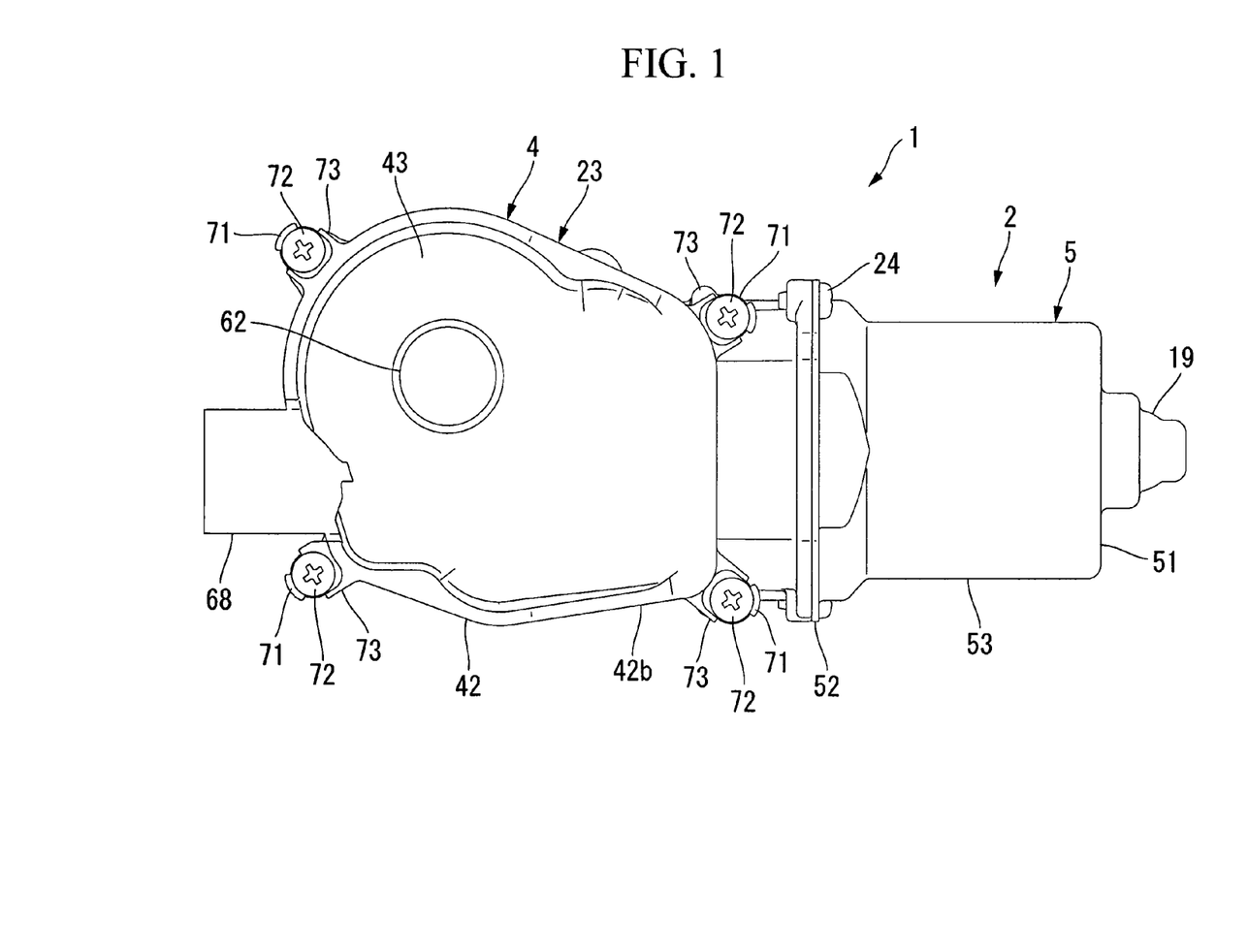
FIG. 1 is a plan view of a reduction motor in an embodiment of the invention.
Figure 2:
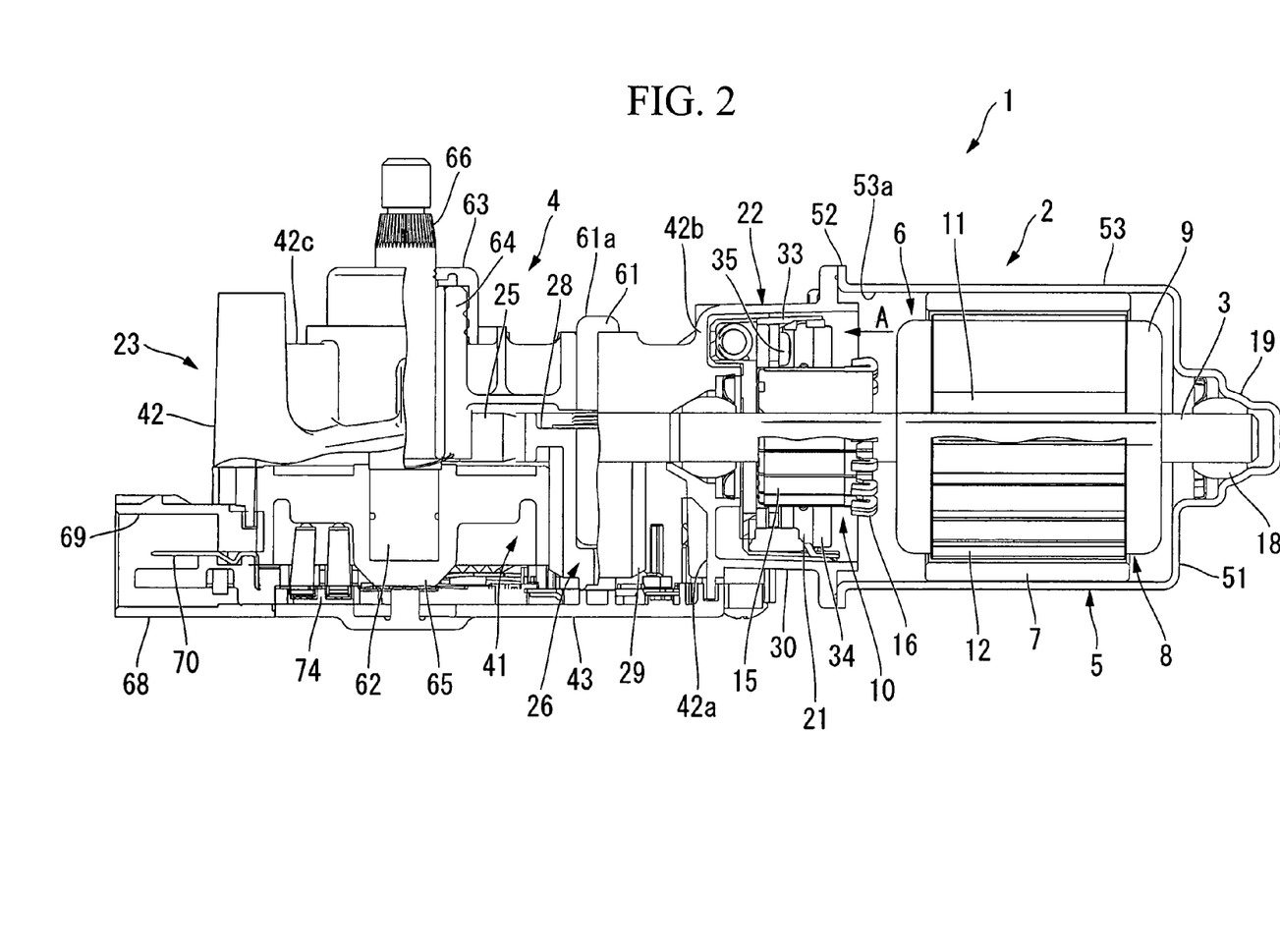
FIG. 2 is a longitudinal sectional view of the reduction motor in the embodiment of the invention.
Figure 3:
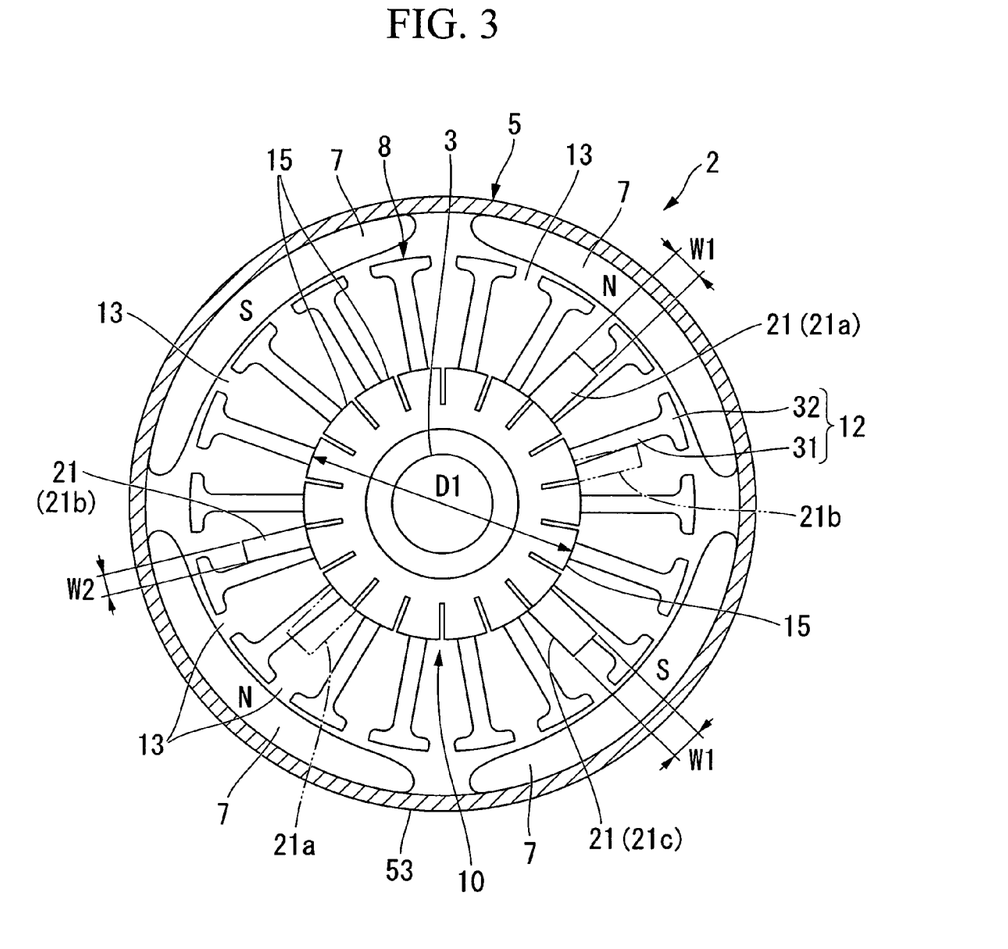
FIG. 3 is a cross-sectional view of an electric motor in the embodiment of the invention.

As shown in FIGS. 1 to 3, a reduction motor 1 is used as, for example, a wiper motor of an automobile, and includes an electric motor 2, and a reduction mechanism 4 coupled to a rotary shaft 3 of the electric motor 2.

The electric motor 2 has a bottomed tubular yoke 5, and an armature 6 rotatably provided within the yoke 5.

A tubular portion 53 of the yoke 5 is formed substantially in the shape of a cylinder, and four segment type permanent magnets 7 are disposed at equal intervals in a circumferential direction on the inner peripheral surface of the tubular portion such that magnetic poles become alternate. That is, the number of pole pairs of the permanent magnets 7 provided at the yoke 5 is set to 2.

The radial center of a bottom wall (end portion) 51 of the yoke 5 is formed with a boss portion 19 which protrudes axially outward, and a bearing 18 for journalling one end of the rotary shaft 3 is provided at the boss portion 19. In addition, the external surface of the yoke 5 is painted in black. Through this black painting, the amount of heat released from the yoke 5 to the outside can be increased, and the rise in temperature of the electric motor 2 can be made low.

An opening 53a of the tubular portion 53 is provided with an outer flange portion 52. The outer flange portion 52 is formed with a bolt-hole (not shown). A bolt 24 is inserted through this bolt-hole, and the yoke 5 is fastened and fixed to the reduction mechanism 4 as the bolt is screwed into a bolt-hole (not shown) formed in a gear housing 23 (which will be described below) of the reduction mechanism 4.

The armature 6 is fitted to the rotary shaft 3 from the outside, and includes a fixed armature core 8, armature coils 9 wound around the armature core 8, and a commutator 10 arranged at the other end of the rotary shaft 3. Each armature core 8 is formed by laminating (laminated core) plates made of a magnetic material punched by press working or the like in the axial direction or pressure-forming (dust core) soft magnetic powder, and has a substantially annular core body 11.

Eighteen teeth 12, which are substantially T-shaped in an axial plan view, are provided in a radial fashion at equal intervals along the circumferential direction at an outer peripheral portion of the core body 11. Each tooth 12 is constituted by a winding drum portion 31 which extends radially and has a winding wire 14 wound therearound, and a peripheral wall portion 32 which is provided at the tip of the winding drum portion 31 and extends so as to become symmetrical with respect to the winding drum portion 31. That is, the peripheral wall portion 32 provided at the tip of the tooth 12 constitutes the outer peripheral surface of the armature core 8, and the peripheral wall portion 32 is brought into a state where the peripheral wall portion faces a permanent magnet 7.

Eighteen dovetail slots 13 are provided between adjacent teeth 12 by providing the teeth 12 in a radial fashion at the outer peripheral portion of the core body 11. The slots 13 extend along the axial direction, and are formed at equal intervals along the circumferential direction.

An enamel-coated winding wire 14 is inserted through between the slots 13, and the winding wire 14 is wound around the winding drum portion 31 of the tooth 12 via an insulator (not shown) which is an insulating material. Thereby, a plurality of armature coils 9 is formed on the outer periphery of the armature core 8.

Here, when the eighteen teeth 12 are formed at equal intervals along the circumferential direction, all the teeth 12 and slots 13 exist point-symmetrically about the rotary shaft 3. On the other hand, the teeth 12 and the slots 13 exist alternately in a positional relationship with intervals of 90 degrees in the circumferential direction.

That is, since four permanent magnets 7 (the number of magnetic poles is four) are provided in the present embodiment, the number of pole pairs is two, and the eighteen teeth 12 (slots 13) are provided with respect to this. That is, the number of the teeth 12 (slots 13) is set to 9 times the number of pole pairs.

Additionally, all the teeth 12 and slots 13 are point-symmetrical about the rotary shaft 3, and the teeth 12 and the slots 13 exist alternately in a positional relationship with intervals of 90 degrees in the circumferential direction. Thereby, the relative positional relationship between an N-pole permanent magnet 7 and each tooth 12 which faces this magnet and the relative positional relationship between an S-pole permanent magnet 7 and each tooth 12 which faces this magnet are brought into the state of having shifted by a distance equivalent to half of the width of a slot 13 along the circumferential direction.

The commutator 10 is inserted from the outside into and fixed closer to the other end of the rotary shaft 3 than the armature core 8. Eighteen segments 15 formed from a conductive material are attached to the outer peripheral surface of the commutator 10. The segments 15 are made of a plate-like metal piece which is long in the axial direction, and are fixed in parallel at equal intervals along the circumferential direction in a state where the segments are insulated from each other. The external diameter D1 of the commutator 10 is set within a range of 20 mm or more and 30 mm or less.

A riser 16 which is bent in a folded-back fashion to the external-diameter side is integrally formed at the end of each segment 15 on the side of the armature core 8. A winding wire 14 which becomes a winding starting end and a winding finishing end of an armature coil 9 is hung around the riser 16, and the winding wire 14 is fixed to the riser 16 by fusing or the like. Thereby, a segment 15 and an armature coil 9 corresponding to this segment are electrically connected to each other.

Figure 5:
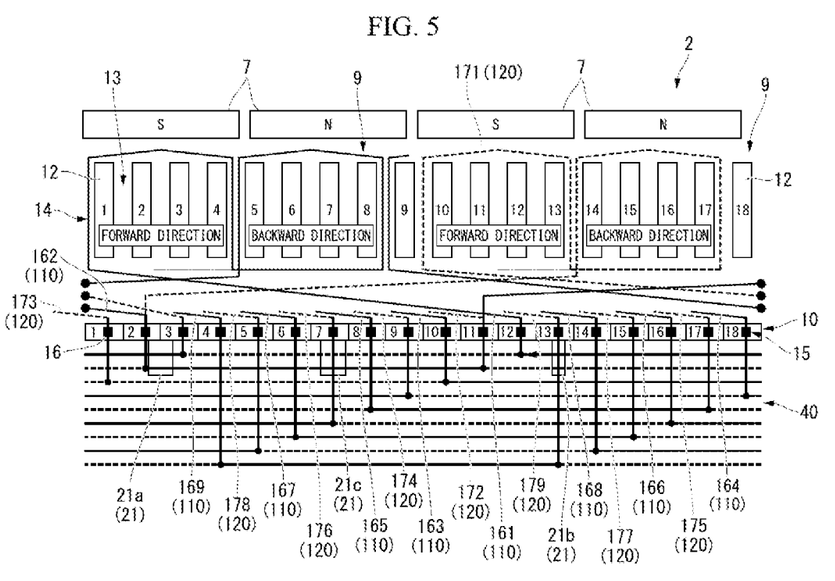
FIG. 5 is a developed view of an armature in the embodiment of the invention.

Additionally, connecting wires 40 are respectively hung around the risers 15 corresponding to equipotential segments 15, i.e., segments 15 (every pair of segments 15 separated from nine positions in the present embodiment) which face each other about the rotary shaft 3, and the connecting wires 40 are fixed to the risers 16 by fusing or the like (refer to FIG. 5). The connecting wires 40 are provided to short-circuit the equipotential segments 15 from each other, and are disposed between the commutator 10 and the armature core 8.

The commutator 10 configured in this way is brought into a state where the commutator faces the gear housing 23 of the reduction mechanism 4. The gear housing 23 is constituted by a housing body 42 which is formed substantially in the shape of a box having an opening 42a on one face thereof and houses a gear group 41 of the reduction mechanism 4, and a cover 43 which blocks the opening 42a of the housing body 42. A brush housing portion 22 is formed on the electric motor 2 side of the housing body 42, and the commutator 10 of the electric motor 2 faces the brush housing portion.

Figure 4:
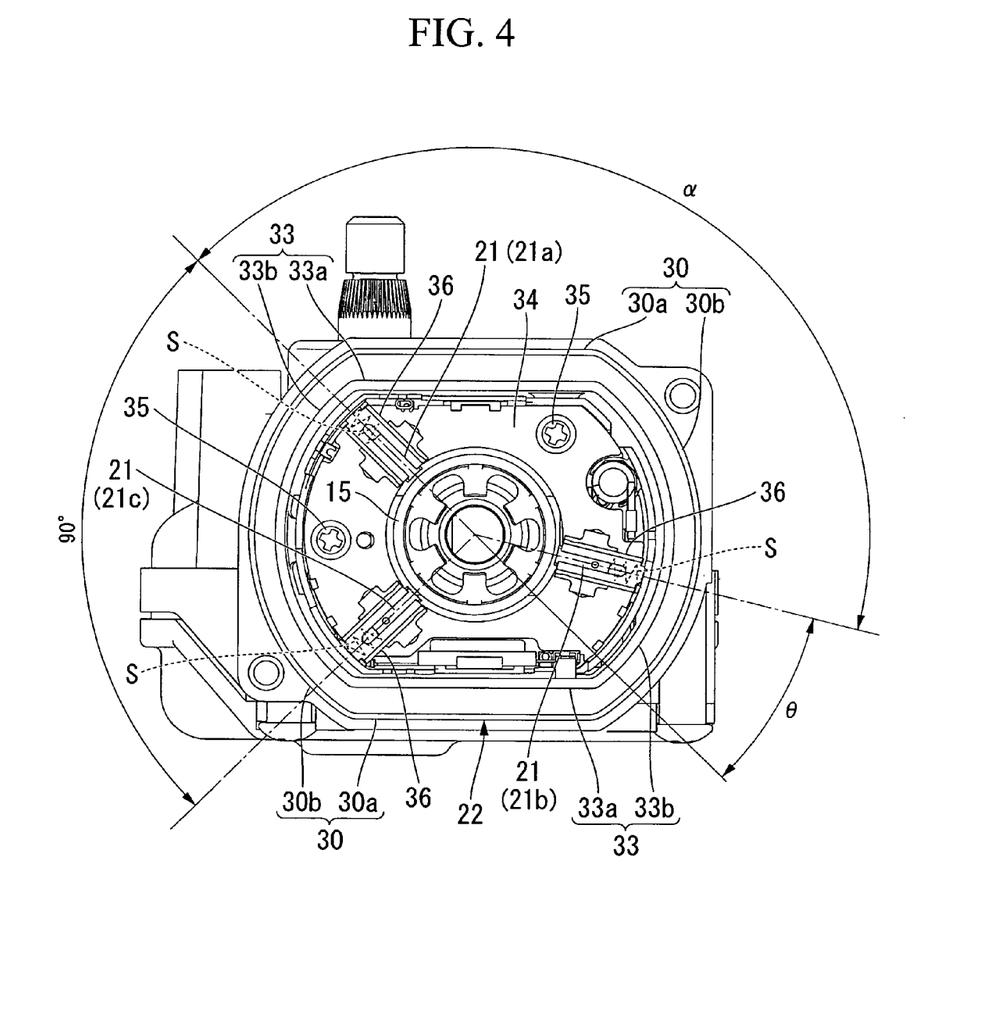
FIG. 4 is a view as seen from an arrow A of FIG. 2.

As shown in FIGS. 2 to 4, the brush housing portion 22 is concavely formed on the electric motor 2 side of the gear housing 23. A peripheral wall 30 of the brush housing portion 22 is formed so as to have a substantially oval cross-section, and is constituted by planar walls 30a and arcuate walls 30b.

A cover 33, which is formed in the shape of a tube having a substantially oval cross-section so as to correspond to the brush housing portion, is provided inside the brush housing portion 22. The cover 33 also has planar walls 33a and arcuate walls 33b. Moreover, a holder stay 34 formed so as to correspond to the cover 33 is provided inside the cover 33. The holder stay 34 is fastened and fixed to the side wall 42b of the housing body 42 by bolts 35.

Brush holders 36 are provided in three places along the circumferential direction at the holder stay 34. Brushes 21 are supported within the brush holders 36, respectively, so as to protrude and retract from the brush holders in a state where the brushes are biased via springs S, respectively. Since the tips of the brushes 21 are biased by the springs S, the tips of the brushes come into sliding contact with the commutator 10, and the electric power (not shown) from the outside is supplied to the commutator 10 via the brushes 21.

Brushes 21 are constituted by a low-speed brush 21a and a high-speed brush 21b, which are connected to the anode side, and a common brush 21c which is used in common by the low-speed brush 21a or the high-speed brush 21b, and is connected to the cathode side. The low-speed brush 21a and the common brush 21c are mutually disposed at an interval of 180° in electrical angle, i.e., at an interval of 90° in the circumferential direction in mechanical angle. Meanwhile, the high-speed brush 21b is arranged apart from the low-speed brush 21a by an angle α in the circumferential direction. In addition, although the present embodiment describes that the common brush 21c is used as the cathode side, and the low-speed brush 21a and the high-speed brush 21b are used as the anode side, the anode side and cathode side may be reversed.

In the present embodiment, the electric resistance value of the high-speed brush 21a is set to be two or more times higher than the electric resistance values of the low-speed brush 21a and the common brush 21c. Therefore, the current value when an electric current is supplied to the armature coils 9 from the high-speed brush 21a can be lowered. Thereby, when an electric current is supplied to the armature coils 9 from the high-speed brush 21a and the armature 6 of the electric motor 2 is rotating at high speed, the current value of a large current (lock current) supplied to the armature coils 9 can be lowered in a case where the rotation of the armature 6 is stopped (locked) by an external load. Therefore, any damage to an element for protecting an electric circuit, such as a fuse provided in a motor drive device, can be prevented in advance.

Here, since the equipotential segments 15 of the commutator 10, i.e., the segments 15 which face each other about the rotary shaft 3, are short-circuited by the connecting wires 40, it is possible to supply electric power even to the segments with which the brushes 21 do not come into sliding contact. Accordingly, the high-speed brush 21b exists at a position which is advanced by an angle θ with respect to the low-speed brush 21a. In addition, in the present embodiment, the angle θ is set to 30 degrees.

By arranging the respective brushes 21a to 21c in this way, the portions of the cover 33 and the holder stay 34 where the brushes 21a to 21c do not exist can be cut away. That is, the cover 33 can be formed so as to have a substantially oval cross-section, and the low-speed brush 21a and the common brush 21c can be arranged near connecting portions between the planar walls 33a and the arcuate wall 33b. On the other hand, the high-speed brush 21b can be arranged at the arcuate wall 33b of the cover 33 opposite to places, in which the low-speed brush 21a of the cover 33 and the common brush 21c are arranged, about the rotary shaft 3. For this reason, the brush housing portion 22 can be formed so as to have a substantially oval cross-section, and it is possible to flatten the brush housing portion 22.

Additionally, as shown in detail in FIG. 3, the circumferential brush widths W1 by which the low-speed brush 21a and the common brush 21c come into sliding contact with the commutator 10 are set to be almost the same. In contrast, the circumferential brush width W2 by which the high-speed brush 21b comes into sliding contact with the commutator 10 is set to be smaller than the brush width W1 of the low-speed brush 21a. Specifically, when the external diameter of the commutator 10 is set within a range of 20 mm or more and 30 mm or less, the brush widths W1 of the low-speed brush 21a and the common brush 21c are set within a range of 2.5 mm or more and 5 mm or less. On the other hand, the brush width W2 of the high-speed brush 21b is set to a range which is equal to and more than 1.5 mm and smaller than 2.5 mm.

By setting the brush widths W1 of the low-speed brush 21a and the common brush 21c, and the brush width W2 of the high-speed brush 21b in this way, it is possible to avoid a situation where the low-speed brush 21a and the high-speed brush 21b come into sliding contact with the same segment 15 simultaneously.

That is, for example, the low-speed brush 21a exists even at a position point-symmetrical with respect thereto about the rotary shaft 3 by a connecting wire 40 connected to the commutator 10 (refer to a two-dot chain line in FIG. 3). In this case, the spacing between the low-speed brush 21a and the high-speed brush 21b becomes almost the same as the spacing between adjacent segments 15, 15. However, since the brush width W2 of the high-speed brush 21b is set to be smaller than the brush width W1 of the low-speed brush 21a, it is possible to avoid a situation where the low-speed brush 21a and the high-speed brush 21b come into sliding contact with the same segment 15 simultaneously.

This is also the same between the high-speed brush 21b and the common brush 21c. That is, the high-speed brush 21b exists even at a position point-symmetrical with respect thereto about the rotary shaft 3 by a connecting wire 40 connected to the commutator 10. However, since the brush width W2 of the high-speed brush 21b is set to be smaller than the brush width W1 of the common brush 21c, it is possible to avoid a situation where the high-speed brush 21b and the common brush 21c come into sliding contact with the same segment 15 simultaneously.

As shown in FIGS. 1 and 2, the gear group 41 housed in the housing body 42 of the gear housing 23 is constituted by a worm shaft 25 coupled to the rotary shaft 3 of the electric motor 2, a stepped gear 26 which meshes with the worm shaft 25, and a spur gear 27 which meshes with the stepped gear 26. The worm shaft 25 has one end coupled to the rotary shaft 3 and the other end rotationally journalled to the housing body 42. The stepped gear 26 is obtained by integrally forming a worm gear 28 which meshes with the worm shaft 25, and a smaller-diameter gear 29 which is formed to have a smaller diameter than the worm gear 28.

An idler shaft 61 is press-fitted into the radial center of the stepped gear 26. The idler shaft 61 protrudes to the side opposite to the smaller-diameter gear 29, and this protruding end 61a is rotationally journalled to the housing body 42. On the other hand, the tip of the smaller-diameter gear 29 which exists at the end opposite to the end 61a of the idler shaft 61 is rotationally journalled to the cover 43. In this way, the stepped gear 26 is brought into a state where both ends thereof are journalled to the housing body 42 and the cover 43.

The spur gear 27 meshes with the smaller-diameter gear 29 of the stepped gear 26. A boss portion 65 is formed at the radial center of the spur gear 27 so as to protrude toward the cover 43 side. The boss portion 65 is rotationally supported by the cover 43. Additionally, an output shaft 62 is press-fitted into the boss portion 65. The output shaft 62 protrudes from a bottom wall (end portion) 42c of the housing body 42. The boss portion 63 is formed at the part of the bottom wall 42c of the housing body 42 corresponding to the output shaft 62 so as to protrude outward. The boss portion 63 is provided with a sliding bearing 64 for rotationally journalling the output shaft 62.

The portion of the output shaft 62 which protrudes from the housing body 42 is formed with a tapered portion 66 which is gradually tapered as it goes to the tip. The tapered portion 66 is formed with serrations 67. Thereby, for example, an external mechanism for driving a wiper or the like and the output shaft 62 can be coupled together.

In addition, a connector 68 is provided at the side wall 42b of the housing body 42 so as to protrude along the axial direction of the rotary shaft 3. The connector 68 is provided to supply the electric power from the outside to the electric motor 2. A receiving port 69 of the connector 68 is provided with a connection terminal 70, and the connection terminal 70 is electrically connected to the brushes 21 (21a to 21c) of the electric motor 2. Therefore, the electric power from the outside is supplied to the commutator 10 via the brushes 21.

Moreover, a bolt seat 71 for fastening and fixing the cover 43 is formed integrally with an opening edge of the housing body 42. An attachment seat 73, which has a bolt-hole (not shown) through which the bolt 72 can be inserted, is integrally formed at the part of the housing body 42 of the cover 43 corresponding to the bolt seat 71. As the bolt 72 is inserted through the attachment seat 73, and the bolt 72 is screwed into the bolt seat 71 of the housing body 42. Thereby, the cover 43 is fastened and fixed to the housing body 42.

Additionally, the cover 43 is provided with a power distribution substrate 74 for electrically connecting the connection terminal 70 of the connector 68 and the brushes 21 of the electric motor 2. The power distribution substrate 74 is formed with a pattern (not shown) which has a role of a lead wire.

Next, the structure for winding the winding wire 14 around the armature core 8 of the armature 6 will be described with reference to FIG. 5.

FIG. 5 is a developed view of the armature 6, and a gap between adjacent teeth 12 is equivalent to the slot 13. In addition, in the following drawings, the respective segments 15 and the respective teeth 12 will be described with reference numerals given thereto.

As shown in detail in this drawing, the equipotential segments 15 are short-circuited by the connecting wires 40. That is, in the present embodiment, every ninth segment 15 (for example, a first segment 15 and a tenth segment 15) are short-circuited by the connecting wires 40, respectively.

Here, the winding wire 14 is constituted by a first conductive wire 110 and a second conductive wire 120. In addition, in FIG. 5, the first conductive wire 110 is shown by solid lines, and the second conductive wire 120 is shown by broken lines.

The first conductive wire 110 is wound in the forward direction between every pair of arbitrary slots 13 and 13 separated by three positions, and is wound in the backward direction between slots 13 and 13 which have shifted by 90 degrees, respectively, in the circumferential direction from the arbitrary slots 13 and 13, thereby forming first to ninth winding wires 161 to 169.

The second conductive wire 120 is wound in the forward direction between every pair of arbitrary slots 13 and 13 separated by three positions, and is wound in the backward direction between slots 13 and 13 which have shifted by 90 degrees, respectively, in the circumferential direction from the arbitrary slots 13 and 13, thereby forming other first to ninth winding wires 171 to 179.

The first to ninth winding wires (161 to 169) and the other first to ninth winding wires (171 to 179) exist at positions which are respectively point-symmetrical about the rotary shaft 3.

That is, the first winding wire 161 formed by the first conductive wire 110 and the other first winding wire 171 formed by the second conductive wire 120 exist at positions which face each other about the rotary shaft 3, and a first winding wire pair is formed by the winding wire 161 and the winding wire 171. Similarly, a second winding wire pair (162, 172), a third winding wire pair (163, 173), a fourth winding wire pair (164, 174), a fifth winding wire pair (165, 175), a sixth winding wire pair (166, 176), a seventh winding wire pair (167, 177), an eighth winding wire pair (168, 178), and a ninth winding wire pair (169, 179) are formed by the second to ninth winding wires 162 to 169 and the other second to ninth winding wires 172 to 179, respectively.

The first to ninth winding wires 161 to 169 are connected in a series via nine connecting wires 40, respectively. On the other hand, the other first to ninth winding wires 171 to 179 are connected in a series via nine connecting wires 40, respectively. A winding starting end and a winding finishing end of each of the winding wires 161 to 179 are connected between adjacent segments 15 and 15. The first to ninth winding wires 161 to 169 and the other first to ninth winding wires 171 to 179, which are formed between the slots 13, respectively, in this way, can be wound, for example, using a double flyer type winding machine or the like.

Next, the operation of the reduction motor 1 will be described.

First, during low rotational driving, in the electric motor 2 of the reduction motor 1, electric power is supplied to the common brush 21c and the low-speed brush 21a. At this time, magnetic fields are generated in the armature coils 9 wound around the armature core 8, and magnetic attractive or repulsive forces are generated between the magnetic fields and the permanent magnets 7 provided at the yoke 5 to drive the rotary shaft 3. On the other hand, during high rotational driving, the electric motor 2 is advanced by the high-speed brush 21b, and operates at higher rotational speed than that during low rotational driving.

When the rotary shaft 3 is driven, the driving is transmitted to the output shaft 62 via the reduction mechanism 4. Since an external mechanism for driving a wiper or the like is coupled to the output shaft 62, the external mechanism operates at a low speed or operates at a high speed according to rotation of the output shaft 62.

Additionally, all the teeth 12 and slots 13 of the electric motor 2 are point-symmetrical about the rotary shaft 3, and the teeth 12 and the slots 13 exist alternately in a positional relationship with intervals of 90 degrees in the circumferential direction, i.e., at an interval of 180 degrees in electrical angle. Thereby, the relative positional relationship between an N-pole permanent magnet 7 and each tooth 12 which faces this magnet and the relative positional relationship between an S-pole permanent magnet 7 and each tooth 12 which faces this magnet are brought into the state of having deviated by a distance equivalent to half of the width of a slot 13 along the circumferential direction.

For this reason, the generation timing of the cogging torque of a tooth 12 of the portion corresponding to an N pole and the generation timing of the cogging torque of a tooth 12 of the portion corresponding to an S pole shift from each other. Therefore, the cogging torque of the whole electric motor 2 decreases.

Additionally, since electric power is supplied by the common brush 21c and the low-speed brush 21a during low rotational driving, electric power is not supplied to the high-speed brush 21b, and a non-energized state is brought about. For this reason, when the high-speed brush 21b exists so as to straddle between adjacent segments 15 and 15, the segments 15 and 15 are short-circuited by the high-speed brush 21b. Also, the winding wire 14 connected to the short-circuited segments 15 and 15 only becomes a closed loop. As a result, a difference is caused in the number of coils of an equivalent electric circuit.

At this time, since magnetic flux passes through the winding wire 14 which becomes a closed loop by the high-speed brush 21b, an induced voltage (counter-electromotive force) is generated in the winding wire 14 due to a change in this magnetic flux. An electric current in a direction opposite to the energized direction flows momentarily due to this induced voltage (counter-electromotive force), and commutation deteriorates. This will increase a torque ripple.

However, in the present embodiment, the brush widths W1 of the low-speed brush 21a and the common brush 21c in the circumferential direction are set to be almost the same as each other, and the circumferential brush width W2 of the high-speed brush 21b is set to be smaller than the brush width W1 of the low-speed brush 21a (refer to FIG. 3). For this reason, the time for which the high-speed brush 21b short-circuits adjacent segments 15 and 15 can be set, and the electric current which flows into the winding wire 14 in which a closed loop has been formed by the high-speed brush 21b, can be reduced.

On the other hand, since electric power is supplied by the common brush 21c and the high-speed brush 21b during high rotational driving, electric power is not supplied to the low-speed brush 21a, and a non-energized state is brought about. However, since an induced voltage (counter-electromotive force) which deteriorates commutation is not easily generated in the low-speed brush 21a, the low-speed brush 21a has almost no influence during high rotational driving.

Accordingly, according to the above-described embodiment, the number of pole pairs is 2, i.e., the number of magnetic poles are four, and multiple slots are formed (the numbers of slots are 7 times, 9 times, and 11 times the number of pole pairs). Thus, the cogging torque can be reduced even in the variable-speed electric motor 2. For this reason, it is possible to reduce the vibration and noise of the electric motor 2 (reduction motor 1).

Particularly, an increase in the torque ripple resulting from the high-speed brush 21b can be reduced during low rotational driving with high use frequency, as compared to during high rotational driving. For this reason, it is possible to further reduce the vibration and noise of the electric motor 2 during low rotational driving.

Additionally, by setting the circumferential brush width W2 of the high-speed brush 21b to be smaller than the circumferential brush widths W1 of the low-speed brush 21a and the common brush 21c, it is possible to avoid a situation where the low-speed brush 21a and the high-speed brush 21b come into sliding contact with the same segment 15 simultaneously. For this reason, it is possible to provide a small-sized high-performance electric motor 2 with multiple slots.

Moreover, as the reduction motor 1 is constituted by the electric motor 2, and the reduction mechanism 4 coupled to the rotary shaft 3 of the electric motor 2, it is possible to achieve miniaturization and high performance of the reduction motor 1.

In addition, it should be understood that the invention is not limited to the above-described embodiment, but various modifications may be made to the above-described embodiment without departing from the scope of the invention.

Additionally, the case where the armature core 8 of the electric motor 2 is provided with eighteen teeth 12, and the number of the teeth 12 is set to 9 times the number of pole pairs has been described in the above-described embodiment. However, the number of the teeth 12 is not limited thereto. In a case where high performance by multiple slots of the electric motor 2 is taken into consideration, it is desirable to set the number of the teeth 12 to any of 7 times, 9 times, and 11 times the number of pole pairs.

INDUSTRIAL APPLICABILITY

As described above, according to the invention, it is possible to provide a variable-speed electric motor and a reduction motor which can reduce the vibration and noise while achieving miniaturization and high performance.

DESCRIPTION OF THE REFERENCE SYMBOLS

1: REDUCTION MOTOR
2: ELECTRIC MOTOR
3: ROTARY SHAFT
4: REDUCTION MECHANISM
5: YOKE
6: ARMATURE
7: PERMANENT MAGNET (MAGNETIC POLE)
8: ARMATURE CORE
9: ARMATURE COIL (COIL)
10: COMMUTATOR
12: TEETH
13: SLOT
14: WINDING WIRE (COIL)
15: SEGMENT
21: BRUSH
21a: LOW-SPEED BRUSH
21b: HIGH-SPEED BRUSH
21c: COMMON BRUSH
25: WORM SHAFT
28: WORM GEAR
40: CONNECTING WIRE (SHORT-CIRCUITING MEMBER)
D1: EXTERNAL DIAMETER
W1, W2: BRUSH WIDTH

The invention claimed is:

1. An electric motor comprising:
a yoke whose number of pole pairs is 2;
an armature rotationally journalled to the yoke, the armature including:
a rotary shaft journalled to the yoke;
an armature core attached to the rotary shaft and having a plurality of teeth extending in a radial fashion toward the radial direction;
coils wound around the plurality of teeth;
a plurality of slots formed between the teeth and extending along the axial direction; and
a commutator provided at the rotary shaft so as to be adjacent to the armature core, and having a plurality of segments arranged in the circumferential direction; and
brushes which supply electric power to the coils via the segments come into sliding contact with the segments,
wherein the commutator is provided with short-circuit members which short-circuit equipotential segments,
wherein the brushes are constituted by three brushes of a low-speed brush, a high-speed brush, and a common brush used in common by the low-speed and high-speed brushes and juxtaposed along the circumferential direction,
wherein the circumferential width of the high-speed brush is set to be smaller than the circumferential width of the low-speed brush, and the high-speed brush and the low-speed brush are formed so that simultaneous sliding contact with the equipotential segments can be avoided, and
wherein the armature core is provided such that the plurality of teeth is point-symmetrical about the rotary shaft at equal intervals in the circumferential direction, and the teeth and the slots are formed so a tooth and a slot exist alternately at intervals of 90 degrees in the circumferential direction.

2. The electric motor according to claim 1, wherein the number of the plurality of teeth and the plurality of slots are set to any of 7 times, 9 times, and 11 times the number of pole pairs.

3. The electric motor according to claim 1, wherein the external diameter of the commutator is set to 20 mm or more and 30 mm or less.

4. The electric motor according to claim 1, wherein the circumferential widths of the low-speed brush and the common brush are set to 2.5 mm or more and 5 mm or less.

5. The electric motor according to claim 1, wherein the circumferential width of the high-speed brush is set to a range which is equal to or more than 1.5 mm or more and smaller than 2.5 mm.

6. A reduction motor comprising:
the electric motor according to any of claims 1 to 5,
a worm shaft coupled to the rotary shaft of the electric motor, and
a worm gear which meshes with the worm shaft.

* * * * *

UNITED STATES PATENT AND TRADEMARK OFFICE
CERTIFICATE OF CORRECTION

PATENT NO. : 8,436,505 B2  
APPLICATION NO. : 12/998316  
DATED : May 7, 2013  
INVENTOR(S) : Saito et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 46 days.

Signed and Sealed this
Eighth Day of September, 2015

Michelle K. Lee
*Director of the United States Patent and Trademark Office*